(12) United States Patent
Bisaillon et al.

(10) Patent No.: US 8,459,483 B2
(45) Date of Patent: Jun. 11, 2013

(54) ANTI-SIPHONING DEVICE FOR FUEL TANKS

(75) Inventors: Gerard Bisaillon, Magog (CA); Michel Beaudoin, Bonsecours (CA)

(73) Assignee: Les Aciers Robond Inc., Magog, Quebec (CA)

( * ) Notice: Subject to any disclaimer, the term of this patent is extended or adjusted under 35 U.S.C. 154(b) by 0 days.

(21) Appl. No.: 13/137,886

(22) Filed: Sep. 20, 2011

(65) Prior Publication Data

US 2012/0181275 A1    Jul. 19, 2012

Related U.S. Application Data

(60) Provisional application No. 61/457,140, filed on Jan. 13, 2011.

(51) Int. Cl.
*B60K 15/04* (2006.01)

(52) U.S. Cl.
USPC ........................................ 220/86.3

(58) Field of Classification Search
USPC ............................... 220/86.2, 86.3
See application file for complete search history.

(56) References Cited

U.S. PATENT DOCUMENTS

| 2,145,759 | A | * | 1/1939 | Fellows et al. | 220/86.3 |
| 2,496,992 | A | * | 2/1950 | Glidden | 220/86.3 |
| 4,326,641 | A | * | 4/1982 | Wilken | 220/86.3 |
| 4,343,410 | A | * | 8/1982 | Lenda | 220/86.1 |
| 4,345,694 | A | * | 8/1982 | Chambers | 220/86.3 |
| 7,040,360 | B2 | * | 5/2006 | Watson | 141/255 |

* cited by examiner

*Primary Examiner* — Steven A. Reynolds
*Assistant Examiner* — King M Chu
(74) *Attorney, Agent, or Firm* — George A. Seaby

(57) ABSTRACT

An anti-siphoning device for use in the tubular fuel filling neck of a vehicle such as a large truck includes a tubular body, which is mounted in the filling neck, resilient fingers on the body for resisting removal of the body from the neck, a plate in the body with a central opening for receiving a fuel dispensing nozzle, vent openings in the plate around the central opening for discharging gases from the fuel tank during a filling operation, a tube extending downwardly from the central opening, and a cage on the bottom end of the tube for preventing insertion of a siphoning tube into the tank.

7 Claims, 5 Drawing Sheets

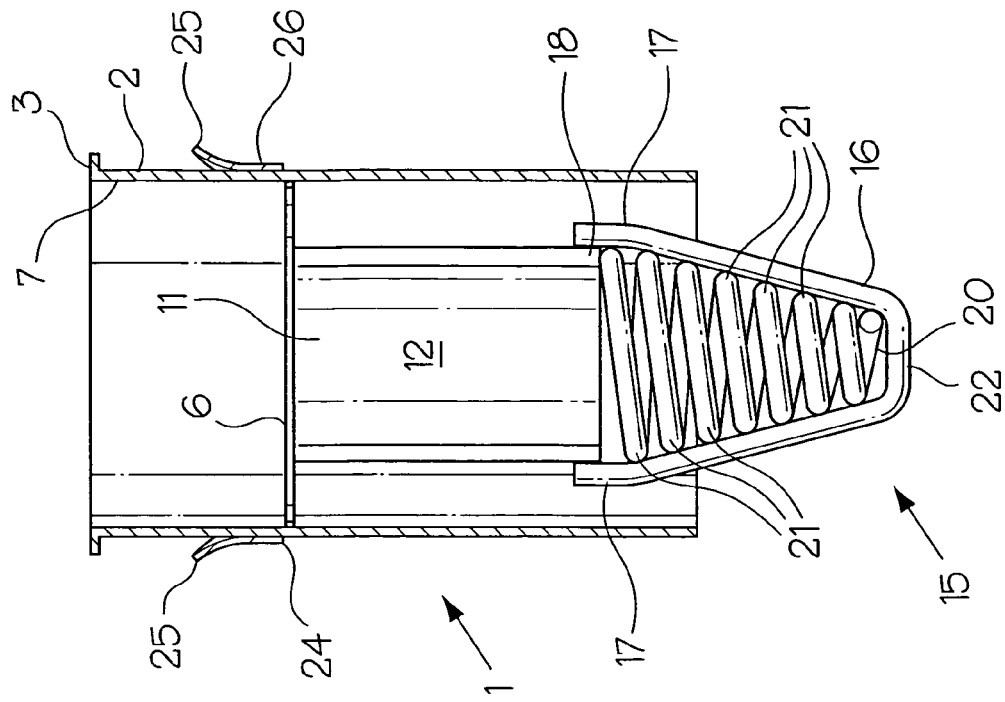
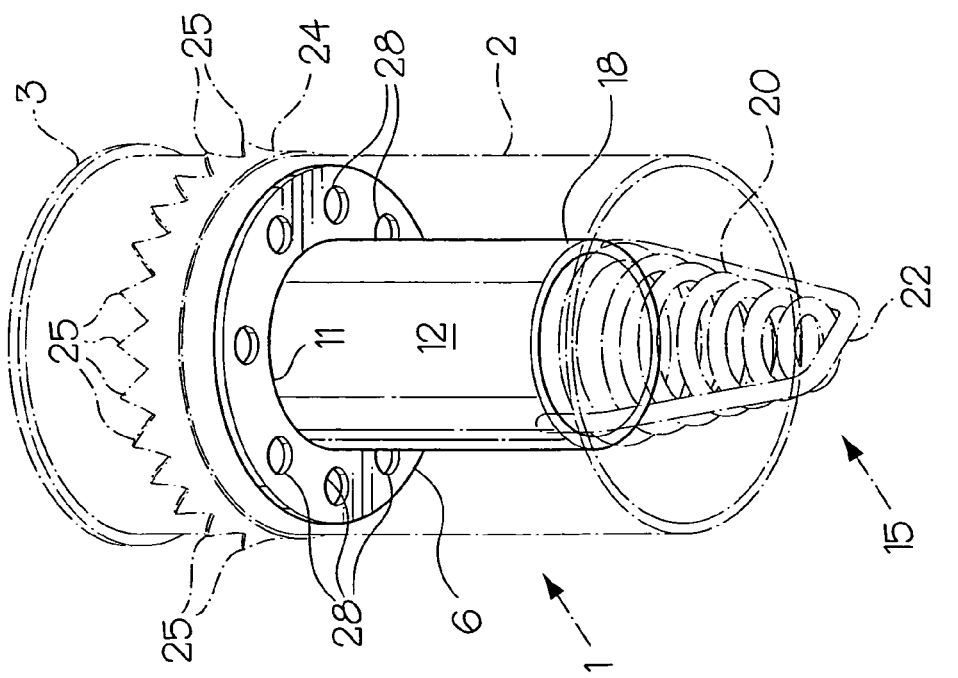
FIG. 4
FIG. 5

ANTI-SIPHONING DEVICE FOR FUEL TANKS

This application claims the benefit of U.S. Provisional Application No. 61/457,140, filed on Jan. 13, 2011, which is incorporated herein by reference in its entirety.

FIELD OF THE INVENTION

This invention relates to an anti-siphoning device for vehicle fuel tanks, and in particular to an anti-siphoning device for use in the filling necks of the fuel tanks of trucks.

DESCRIPTION OF RELATED ART

Theft of fuel from large trucks is a serious problem, particularly as the cost of fuel continues to rise. Solutions to this problem include gas tank locks and the mounting of anti-siphoning assemblies in the filling necks of truck fuel tanks. An example of such an assembly is described, for example, in U.S. Pat. No. 7,040,360. A problem with some such assemblies is the ease of filling the fuel tank. Some assemblies provide obstructions in the filling neck without proper venting of air from the tank which causes turbulence and reduces the flow of fuel into the tank.

BRIEF SUMMARY OF THE INVENTION

The present invention provides a relatively simple, inexpensive anti-siphoning device, which is easy to produce and to retrofit to existing fuel tanks. Moreover, the device of the present invention does not substantially impede the flow of fuel into the tank.

One version of the anti-siphoning of the present invention includes a tubular body for insertion into the filling neck of a vehicle fuel tank; a flange on the top end of the body for limiting movement of the body into the filling neck; resilient fingers extending outwardly from an exterior surface of the body for preventing removal of the device from the filling neck; a plate with a central opening attached to an interior surface of the body near the top end thereof; vent openings in the plate around and spaced apart from the central opening for discharging gases from the fuel tank during a filling operation; a tube extending downwardly from the plate around the central opening for receiving a fuel dispensing nozzle; and a cage on the bottom end of the tube for preventing insertion of a siphoning tube into fuel in the tank.

In accordance with one embodiment, the cage includes a downwardly tapering, coiled rod with spaces between adjacent coils, and a generally U-shaped rod containing the helical rod and having top ends connected to the bottom end of the exterior surface of the body.

A second version of the cage includes the downwardly tapering coiled rod with spaces between adjacent coils, and a plurality of generally L-shaped rods spaced equidistant apart around the periphery of the coiled rod. The top ends of the L-shaped rods are welded to the bottom end of the body, and the bottom free ends of such rods are welded together beneath the bottom end of the coiled rod.

BRIEF DESCRIPTION OF THE DRAWINGS

The invention is described in greater detail with reference to the accompanying drawings, wherein:

FIG. 4 is an isometric view of a second embodiment of the anti-siphoning device of the present invention;

FIG. 5 is a longitudinal sectional view of the device of FIG. 4;

DETAILED DESCRIPTION OF THE INVENTION

Figure 1:
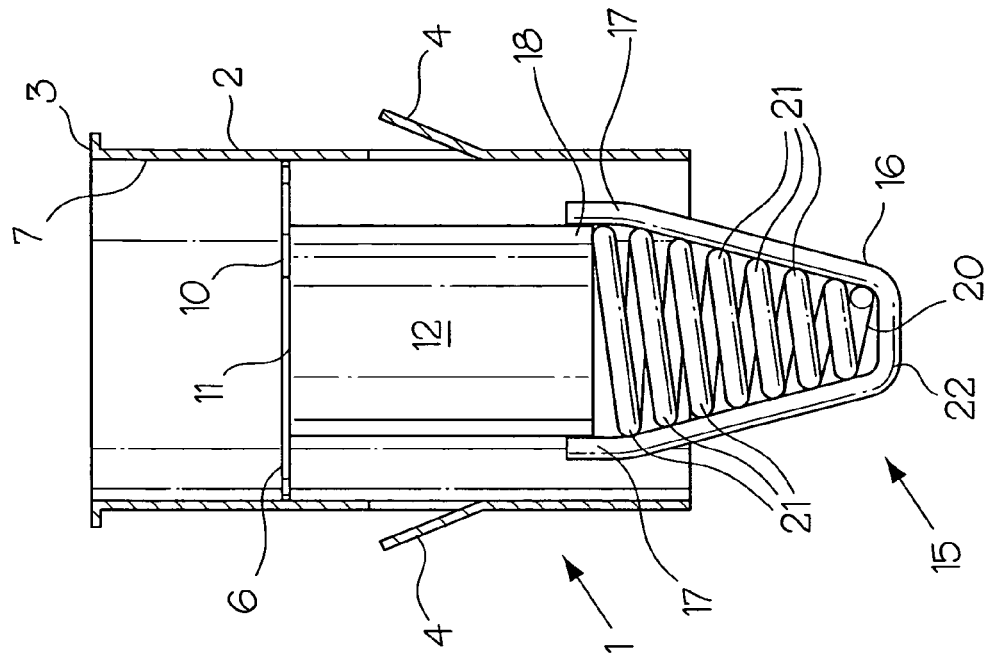
FIG. 1 is an isometric view of a preferred embodiment of the anti-siphoning device as viewed from below.
Figure 2:
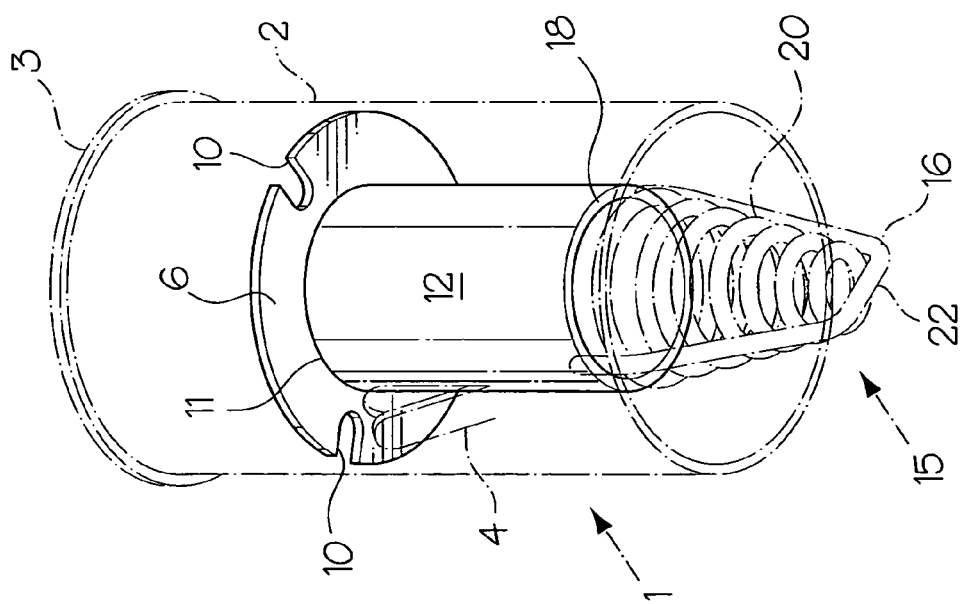
FIG. 2 is a longitudinal sectional view of the anti-siphoning device of FIG. 1.
Figure 3:
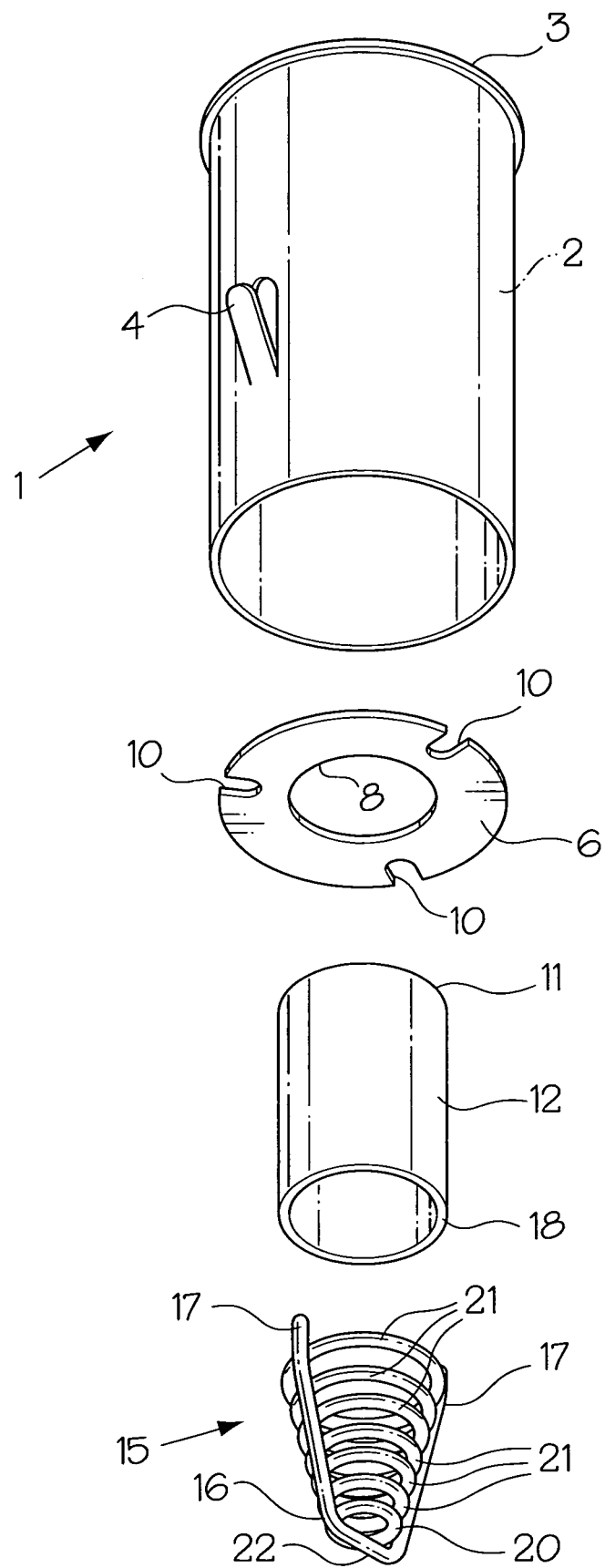
FIG. 3 is an exploded, isometric view of the anti-siphoning device of FIGS. 1 and 2.

With reference to FIGS. 1 to 3, the anti-siphoning device includes a tubular body indicated generally at 1. The body 1 is defined by a cylindrical steel side wall 2 with an annular flange 3 at the top end thereof. In use, the body 1 is slid into the filling neck (not shown) of a fuel tank, the flange 3 limiting movement of the body into the filling neck. A pair of diametrically opposed, slightly resilient fingers 4 extend outwardly from the side wall 2 of the body 1. When the body 1 is pushed into the filling neck of a fuel tank, the fingers 4 spring outwardly to prevent removal of the anti-siphoning device from the filling neck, i.e. if an attempt is made to remove the device from the filling neck, the fingers 4 engage the interior or bottom of the filling neck and/or the area of the fuel tank interior around the filling neck.

An annular plate 6 is welded to the interior surface 7 of the body 1 between the top end and center thereof. A central opening 8 (FIG. 3) in the plate 6 is intended to receive a fuel dispensing nozzle (not shown) at a fuel station. A plurality of vent openings defined by U-shaped notches 10 are provided in the periphery of the plate 6 permitting venting of air from the fuel tank during a filling operation. The top end 11 of a tube 12 is welded to the plate 6 around the bottom periphery of the opening 8 for receiving the fuel dispensing nozzle.

A cage indicated generally at 15 is suspended from the tube 12. The cage 15 includes a generally U-shaped rod 16, the top ends 17 of the sides of which are welded to opposite sides of the bottom end 18 of the tube 12, and a downwardly tapering coiled rod 20, the adjacent coils 21 of which are spaced a short distance apart, preferably ¼ inch. The spacing of the coils 21 is such that it is virtually impossible to insert a siphoning tube into a fuel tank equipped with the anti-siphoning device. The rod 16 is welded to at least one of the coils 21 of the rod 20 and partly closes the bottom end 22 of the rod 20, completing an obstruction to a siphoning tube.

Figure 6:
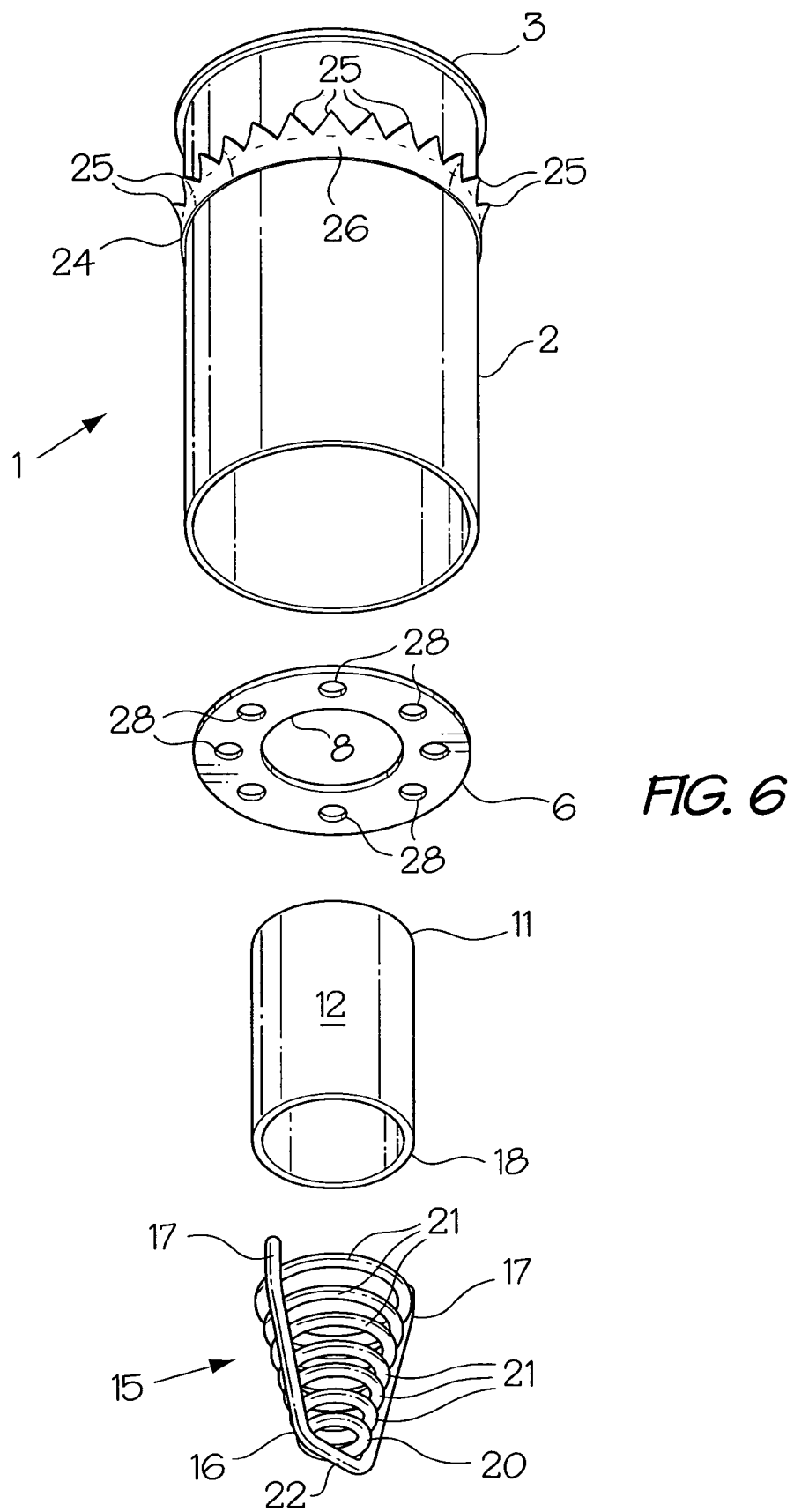
FIG. 6 is an exploded isometric view of the device of FIGS. 4 and 5.

In the following description of the second embodiment of the invention, illustrated in FIGS. 4 to 6, whenever possible the same reference numerals have been used to identify the same or similar elements.

The second embodiment of the invention includes the same basic elements as the first embodiment, namely a tubular steel body indicated generally at 1 with a cylindrical side wall 2 and a top flange 3, an annular plate or disc 6 in the interior of the body 1, a tube 12 extending downwardly from the plate 6 for receiving a fuel dispensing nozzle, and a cage 15 suspended from the bottom end 18 of the tube 12.

Instead of the fingers 4, the second embodiment of the invention includes a steel, crown-shaped ring 24, defined by a plurality of triangular fingers 25 flaring upwardly and outwardly from a cylindrical bottom 26. The cylindrical bottom 26 of the ring 24 extends around and is welded to the side wall 2 of the body 1. The outwardly flaring fingers 25 are designed to securely engage the interior or bottom of a fuel tank filling neck and/or the area around the filling neck for preventing removal of the body 1 from the neck. Also, instead of the vent notches 10, the plate 6 of the second embodiment includes a plurality of holes 28 which serve the same function as the notches 10.

Figure 7:
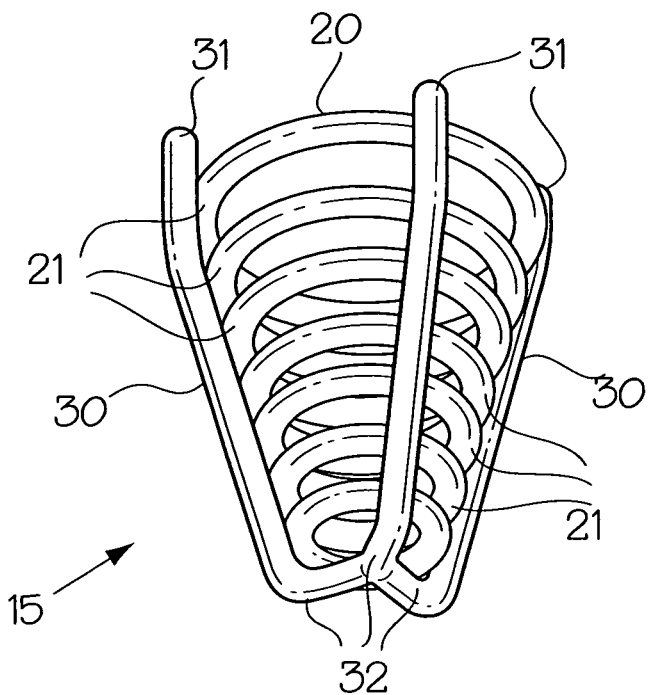
FIG. 7 is an isometric view of a second embodiment of a cage used in the device of FIGS. 1 to 3 or FIGS. 4 to 6.
Figure 8:
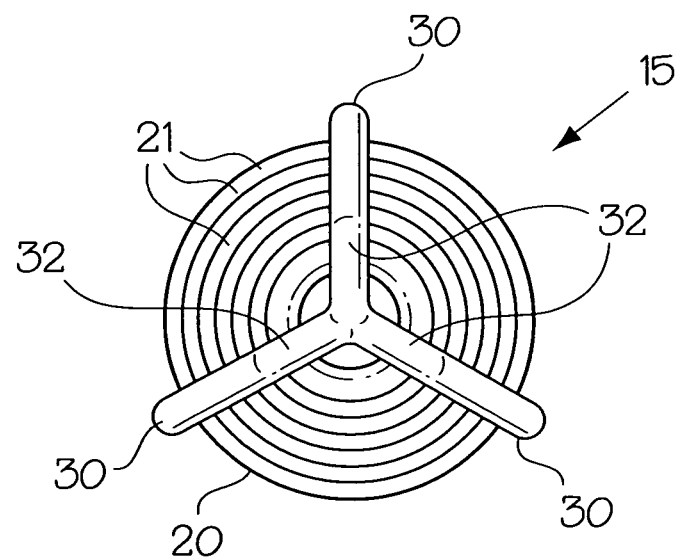
FIG. 8 is a bottom view of the cage of FIG. 7.

With reference to FIGS. 7 and 8, in a second embodiment of the cage 15, the generally U-shaped rod 16 (FIGS. 3, 5 and 6) is replaced by three generally L-shaped rods 30, the top ends 31 of which are welded to the bottom end 18 of the tube 12. The top ends 31 of the rods 30 are spaced apart by 120°, and the bottom ends 32 are welded together defining the center of the bottom end of the cage. The rods 30 are also welded to at least one of the coils 21 of the coiled rod 20.

From the foregoing, it will be appreciated that when the anti-siphoning device is installed in the filling neck of a fuel tank, it is virtually impossible to insert a siphoning tube into the tank. The notches 10 or the holes 28 in the plate 6 and the spacing between the spirals 21 of the coiled rod 20 are too small to permit entry of anything but an extremely small siphoning tube. Moreover, as mentioned above, the bottom of the coil 20 is partially closed by the bottom 22 of the rod 16. Even if a siphoning tube was of sufficiently small diameter to be inserted between the coils 21 of the coiled rod 20, the tube would be bent during insertion and thus crimped, preventing the siphoning of fuel.

Another important feature of the present invention is the provision of vent openings 10 or 28 outside of a central dispensing nozzle receiving tube 12. If the vent openings were in the body of the device, the result would be turbulence which would impede filling of the fuel tank. The vent openings 10 or 28 allow for the unrestricted escape of air from the tank without impeding tank filling.

The invention claimed is:

1. An anti-siphoning device to use in the tubular filling neck of a vehicle fuel tank comprising:
   a tubular body for insertion into the filling neck;
   a flange on a top end of the body for limiting movement of the body into the filling neck;
   resilient fingers extending outwardly and upwardly from an exterior surface of said body for resisting removal of the device from the filling neck;
   a plate welded to an interior surface of the body near the top end thereof, the plate having a central opening for receiving a fuel dispensing nozzle;
   vent openings in the plate around and spaced apart from the central opening for venting gases from the fuel tank during a fueling operation;
   a tube having a top end connected to the plate around the central opening, the tube extending downwardly from the plate for receiving the fuel dispensing nozzle; and
   a cage extending downwardly from a bottom end of the tube for preventing insertion of a siphoning tube beyond the bottom of the device into the fuel tank.

2. The anti-siphoning device of claim 1, wherein said cage includes a downwardly tapering coiled rod connected to the bottom end of the tube, with spaces between adjacent coils sufficient to readily admit fuel while preventing insertion of a siphoning tube into the fuel tank.

3. The anti-siphoning device of claim 2, wherein said cage includes a U-shaped rod having top ends connected to the bottom end of the exterior surface of said body and sides connected to at least one of the coils.

4. The anti-siphoning device of claim 2, wherein said cage includes a plurality of L-shaped rods having top ends connected to the bottom end of the tube, sides connected to at least one of the coils of the cage, and bottom ends connected together beneath the coiled rod.

5. The anti-siphoning device of claim 1, including a crown-shaped ring extending completely around and welded to said body said ring including a cylindrical bottom and the plurality of fingers, said fingers being triangular and flaring upwardly and outwardly from said ring bottom.

6. The anti-siphoning device of any one of claims 1 to 5, wherein said plate is an annular plate having an outer periphery connected to the interior surface of said body, and said vent openings are U-shaped notches in the outer periphery of the plate.

7. The anti-siphoning device of any one of claims 1 to 5, wherein said plate is an annular plate having an outer periphery connected to the interior surface of said body, and aid vent openings are holes in the annular plate.

\* \* \* \* \*